(12) United States Patent
Rivoli

(10) Patent No.: US 6,742,741 B1
(45) Date of Patent: Jun. 1, 2004

(54) UNMANNED AIR VEHICLE AND METHOD OF FLYING AN UNMANNED AIR VEHICLE

(75) Inventor: Louis D. Rivoli, Cedar Hill, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/373,211

(22) Filed: Feb. 24, 2003

(51) Int. Cl.[7] .................................................. B64C 15/00
(52) U.S. Cl. ........................ 244/12.1; 244/13; 244/46; 244/49; 244/58; 244/87; 244/93
(58) Field of Search ............................... 244/4 R, 12.1, 244/13, 14, 46, 49, 58, 93, 87

(56) References Cited

U.S. PATENT DOCUMENTS

| | | | | |
|---|---|---|---|---|
| 3,839,818 A | * | 10/1974 | Heggedal | 446/62 |
| 4,579,298 A | * | 4/1986 | Thomson | 244/3.21 |
| 5,794,887 A | * | 8/1998 | Komerath et al. | 244/75 R |
| 6,550,719 B2 | * | 4/2003 | Konig | 244/55 |
| 2001/0028018 A1 | * | 10/2001 | Darbyshire | 244/93 |

* cited by examiner

*Primary Examiner*—J. Woodrow Eldred
(74) *Attorney, Agent, or Firm*—Alston & Bird LLP

(57) ABSTRACT

An unmanned air vehicle includes a singular rear landing gear wheel on the aft end of the fuselage. Port and starboard wings with rear facing propellers are retractable to the aft of the fuselage. Upon retraction, the propellers may freewheel and a reversible motor-generator is provided to convert the freewheeling propeller energy into electric power. Photovoltaic cells also provide electric power to the unmanned air vehicle. Port and starboard nose fairings are control surfaces for the vehicle. The port and starboard nose fairings also include landing gear wheels. A method of flying an unmanned air vehicle includes retracting port and starboard wings to achieve a ballistic dive.

87 Claims, 13 Drawing Sheets

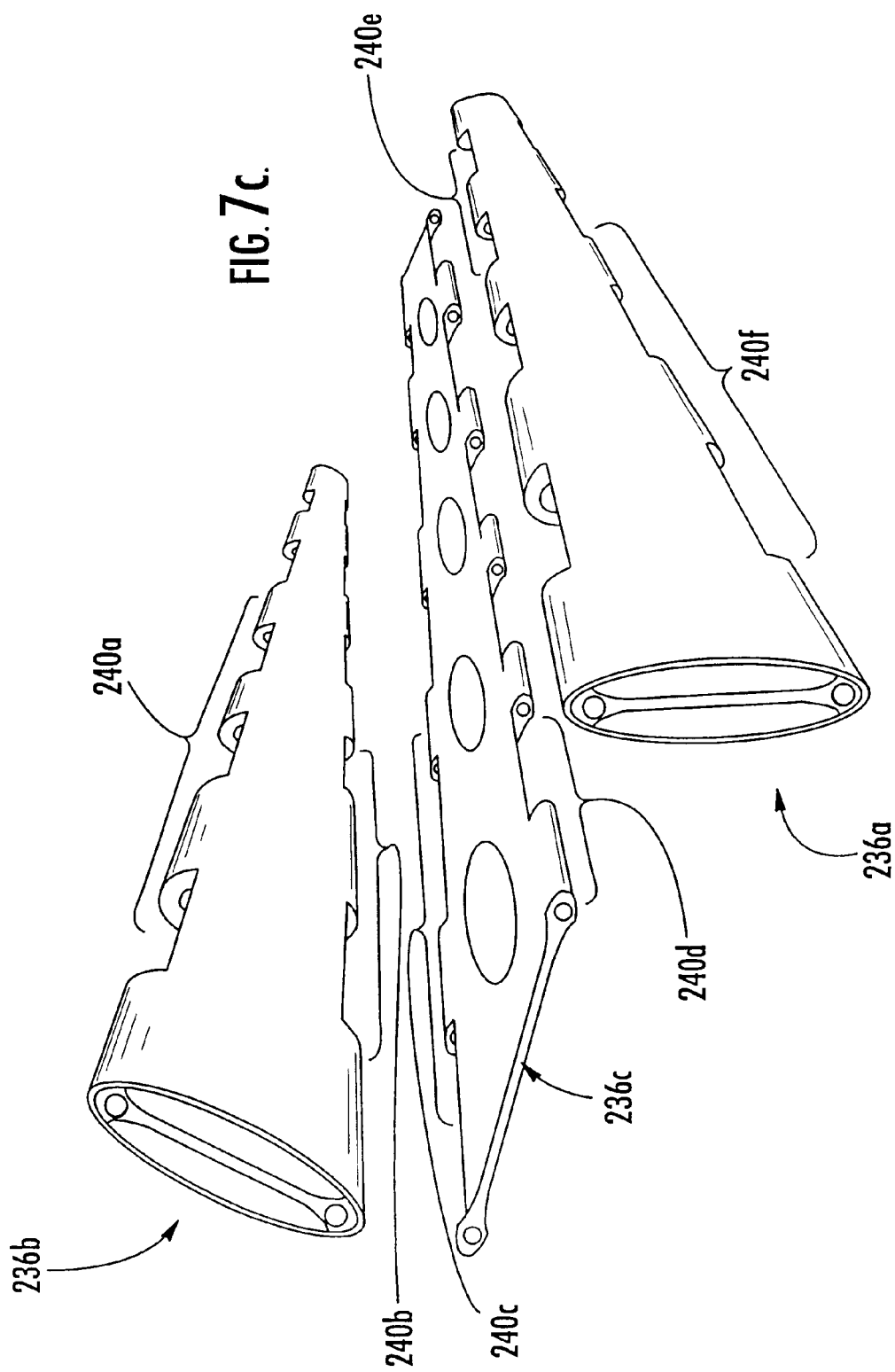

UNMANNED AIR VEHICLE AND METHOD OF FLYING AN UNMANNED AIR VEHICLE

FIELD OF THE INVENTION

The present invention relates to unmanned air vehicles, and, more particularly, to unmanned air vehicles having retractable wings and controllable nose fairings, and methods of flying unmanned air vehicles with retractable wings and controllable nose fairings.

BACKGROUND OF THE INVENTION

The field of unmanned air vehicles (UAV) has increasingly required higher performance and new mission capabilities for both military and conventional uses. Generally speaking, improved mission performance often requires adding new mission platforms to a UAV. Additional weapon systems, new imaging capabilities, etc., continue to be added to existing UAVs extending the limits of their operational capability. For example, as a new imaging system or weapon system is added to a UAV, space must be made within the fuselage to accommodate the new platforms. Other platforms may have been removed to accommodate the new platforms. Additional closures, shutters, doors, etc. may also be required that permit the new platform to operate with a previously existing UAV.

Typically, the addition of new mission platforms on UAVs has led to increasing the weight and redistribution of weight on UAVs. As such, the field of UAVs has been tending toward larger and heavier craft in order to accommodate newer mission platforms and multiple missions. One negative effect of this trend has been reduced range capabilities of UAVs. That is to say that increased size and weight has required greater fuel consumption in order to maintain the same range, which in turn requires greater fuel carrying capacity. Manufacturing UAVs with greater fuel carrying capacity has only compounded the need for larger and heavier UAVs.

Solar powered UAVs have been used in experiment and research, yet have not found commercial viability for military or conventional commercial use. It is generally thought that the weight requirements of UAVs preclude further development in the field of solar powered UAVs. The obvious benefit of solar powered UAVs, however, is increased range. Solar powered UAVs that provide increased range which could be designed to carry lighter weight mission platforms may therefore be more versatile than existing UAVs. Accordingly, there is a need in the art for solar powered UAVs with increased capabilities for carrying mission systems and providing increased range over current UAV systems.

BRIEF SUMMARY OF THE INVENTION

Accordingly, an unmanned air vehicle with improved versatility is provided. According to one embodiment of an unmanned air vehicle, the air vehicle comprises a fuselage having port and starboard retractable wings interconnected to the fuselage. At least one propeller and propeller motor, interconnected to each wing are also provided. As used herein, when a device or element is "interconnected" to another device or element, it may be directly connected, attached, or connected by one or more intervening devices or elements. In one embodiment, a propeller motor includes a propeller motor generator so that the propeller may be permitted to freewheel in order to generate electricity. For example, while the wings are retracted, the port and starboard propellers rotate as a result of the airflow and thereby may be used as motors providing electric current to electronics and other electrical equipment onboard the unmanned air vehicle. For example, the unmanned air vehicle may include a battery for receiving the electric current so that electric energy may be stored for future use and, therefore, provided to the electronics or other electrical equipment onboard the unmanned air vehicle.

According to another embodiment, the unmanned air vehicle includes a movable mass interconnected to the fuselage that is positionable between the forward portion of the fuselage and the aft portion of the fuselage. An actuator moves the movable mass about the fuselage in order to change the center of gravity of the unmanned air vehicle.

One aspect of this unmanned air vehicle includes a nose fairing disposed along the forward portion of the fuselage and typically having port and starboard nose fairings that may pivot about the fuselage. Pivoting nose fairings, therefore, provide aerodynamic flight control and may be individually controlled by a flight control system in order to maneuver the unmanned air vehicle. Another aspect of this invention comprises port and starboard wheels interconnected to outward portions of the port and starboard nose fairings, respectively. As such, the port and starboard nose fairings may be positioned downward to permit the port and starboard wheels to act as landing gear for the unmanned air vehicle.

Another aspect of the unmanned air vehicle also includes a single aft wheel. A single aft wheel for landing and takeoff is interconnected to the fuselage. One aspect of the aft wheel includes a wheel assembly comprising a wheel retainer interconnected to the fuselage, such as by port and starboard wheel fairings. A wheel rim and tire are disposed about the retainer and rotate about circumferentially disposed bearings.

One aspect of the unmanned air vehicle also includes photovoltaic cells, capable of providing an electric current to a battery. The solar powered photovoltaic cell may typically be disposed on an area of the fuselage or wings that will receive sunlight in order to convert sunlight into electrical current for use by other equipment on the unmanned air vehicle.

The unmanned air vehicle of the present invention also permits a method of flying an unmanned air vehicle having retractable wings and nose fairings. According to one embodiment, the method includes pivoting port and starboard nose fairings in order to control the direction of flight of the vehicle. When port and starboard nose fairings are pivoted downwardly, the wheels at the end of the port and starboard nose fairings may be used as landing gear.

Another method of flying an unmanned air vehicle includes retracting port and starboard wings on the unmanned air vehicle and positioning the nose fairings to achieve a downward glide angle toward earth. The mass within the unmanned air vehicle is moved from fore to aft in order to achieve an ascent position of the unmanned air vehicle. The ascent position may be used for weapons delivery, such as from a chemical laser. While the wings are retracted, another aspect of the method permits the propellers to freewheel so that the propellers generate electricity. The electricity can be provided to a battery, electronics or other electrical equipment onboard the aircraft. After the port and starboard wings have been retracted, they may be once again fully extended to a flying position and the port and starboard propeller motor generators reenergized in order to motorize the propellers and provide thrust to the vehicle.

BRIEF DESCRIPTION OF THE SEVERAL VIEWS OF THE DRAWINGS

Figure 1:
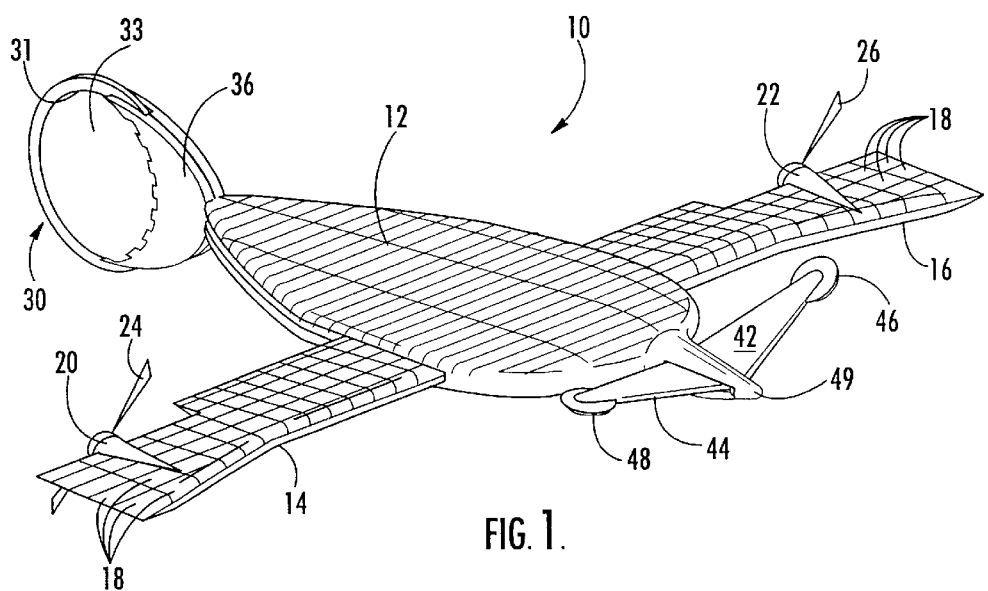
Figure 2:
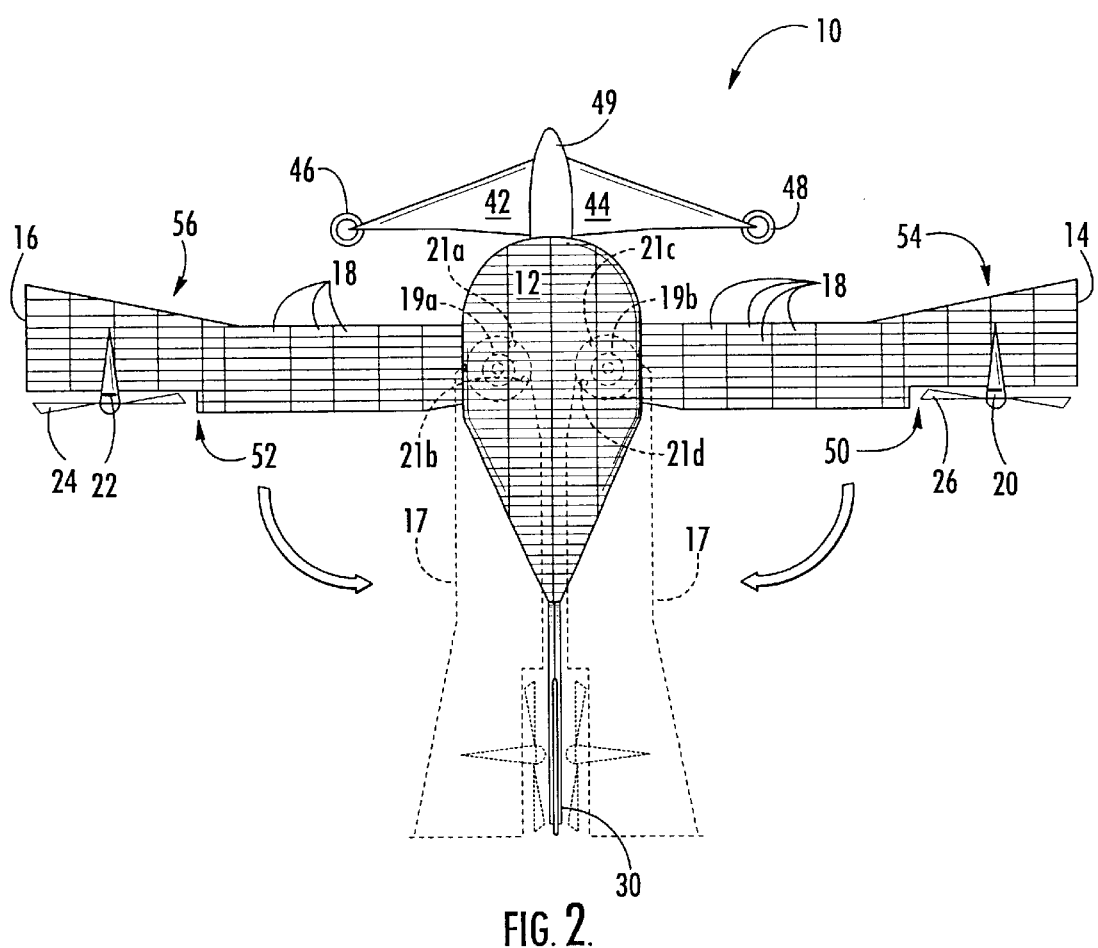
Figure 3A:
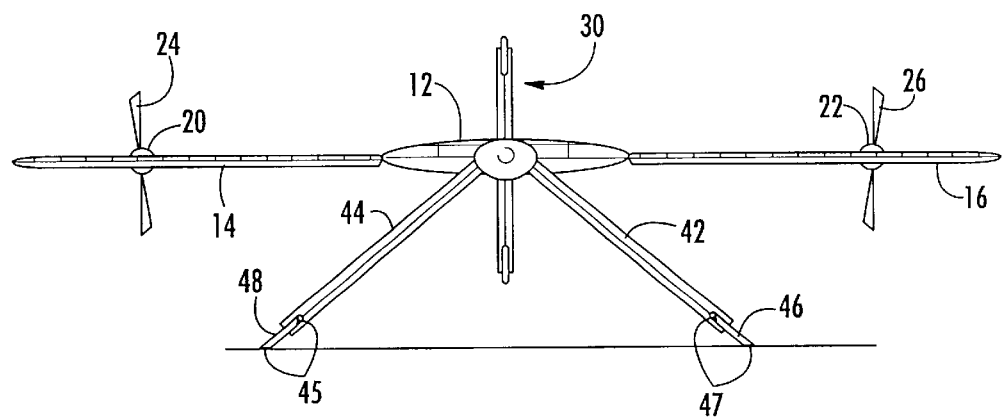
Figure 3B:
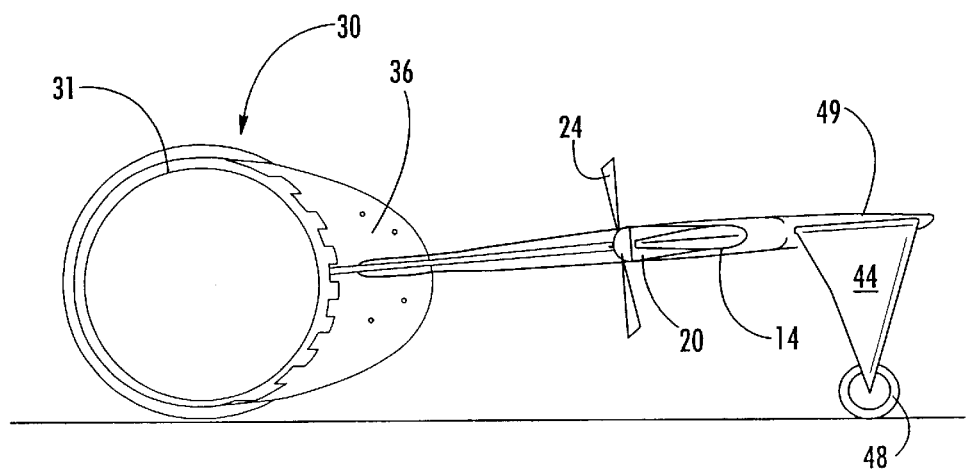
Figure 4A:
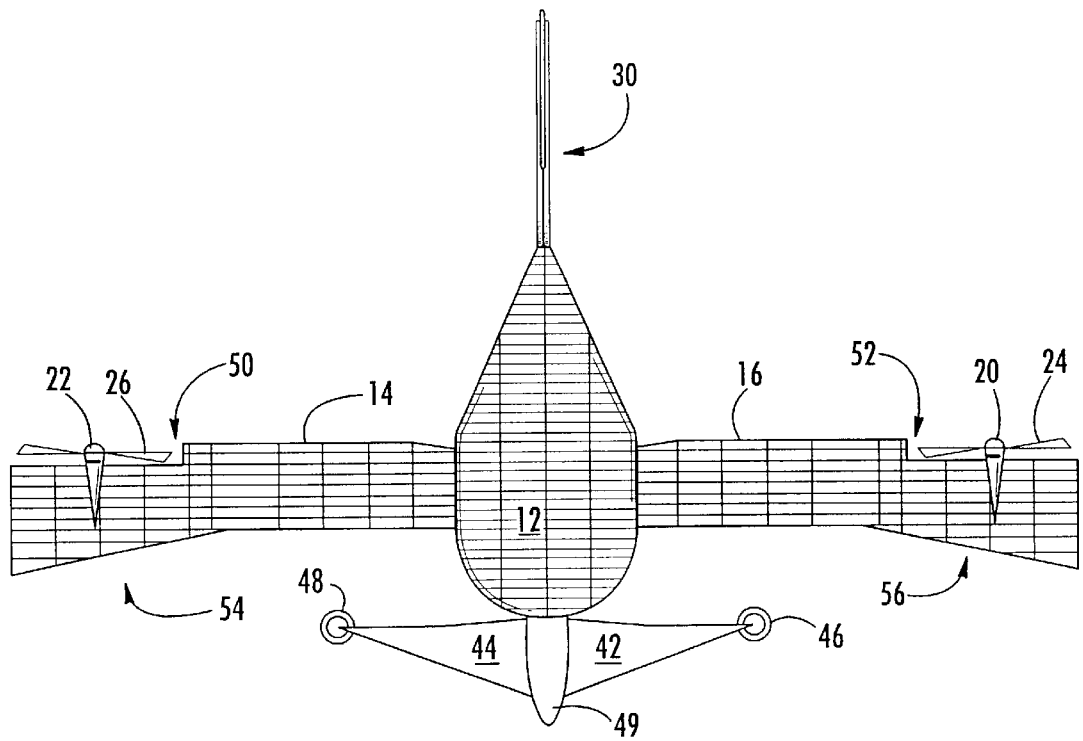
Figure 4B:
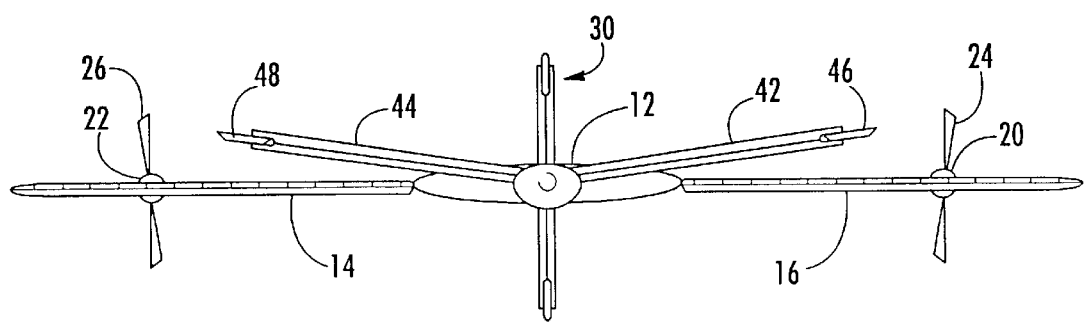
Figure 5:
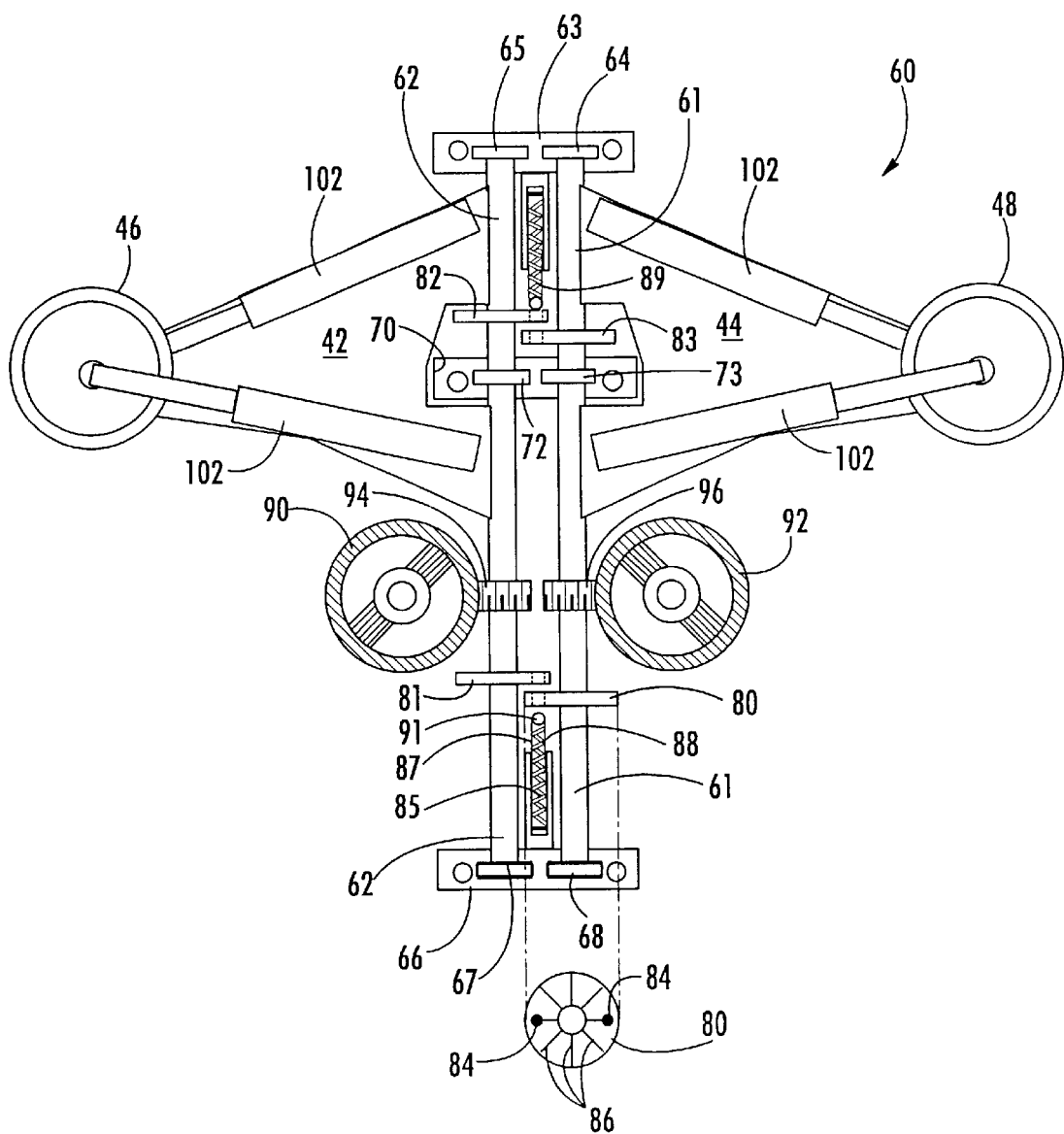
Figure 6A:
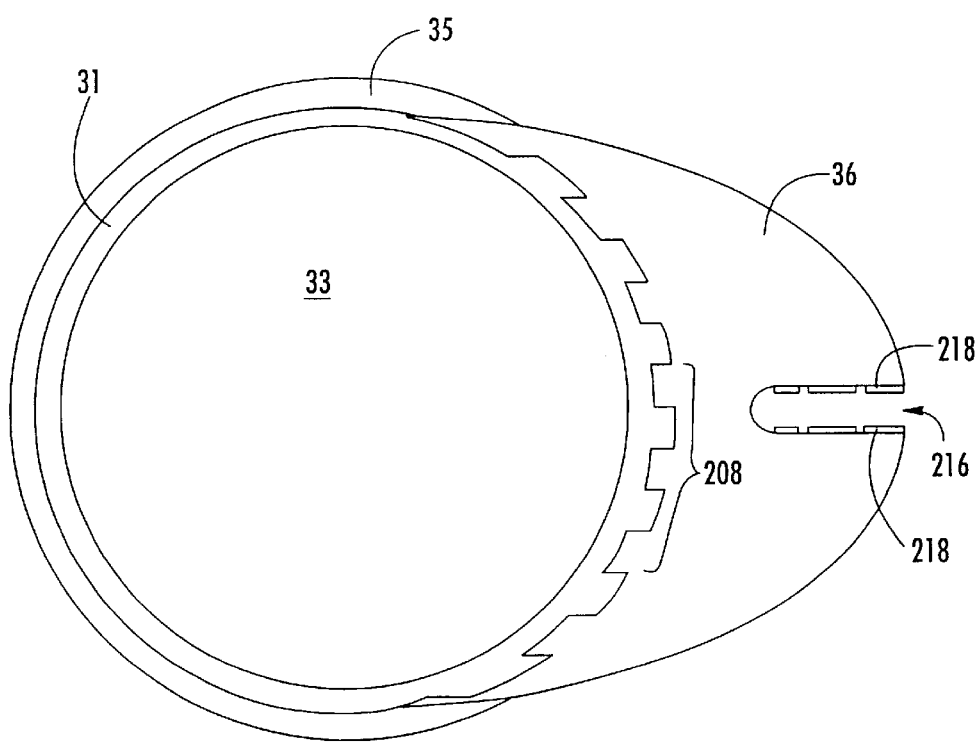
Figure 6B:
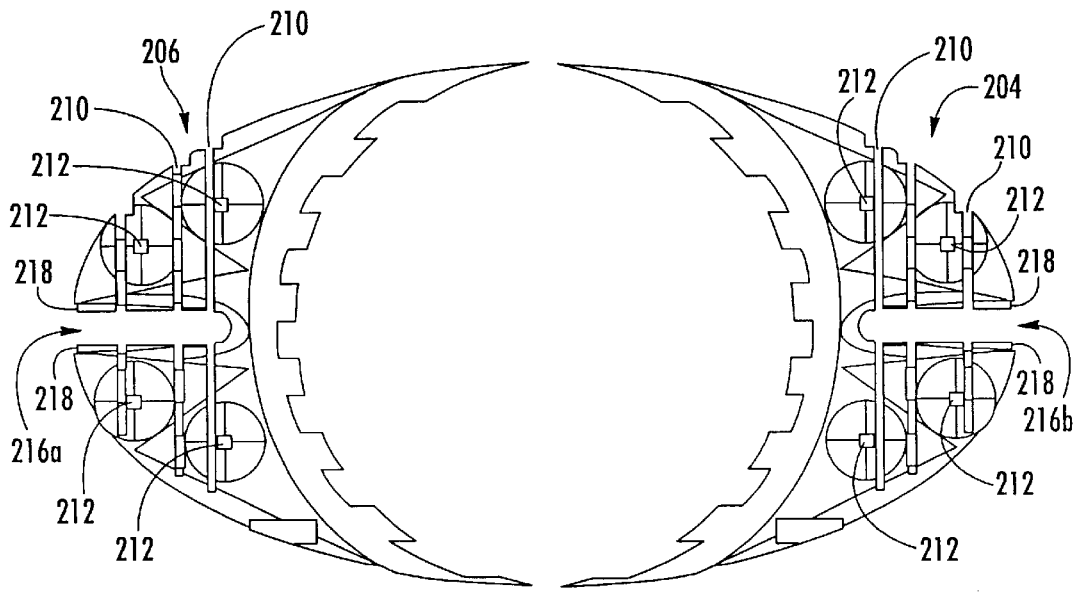
Figures 7A, 7B:
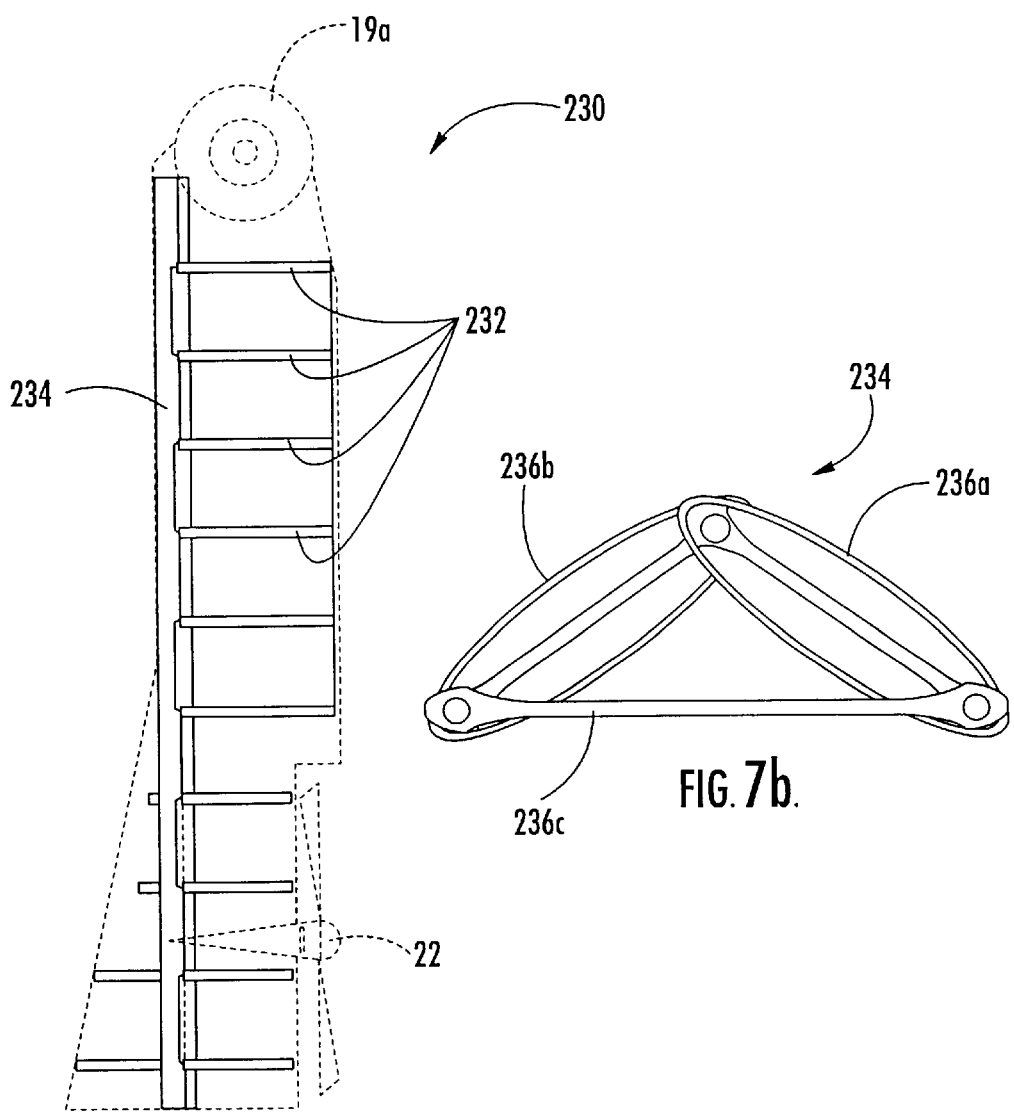
Figure 8:
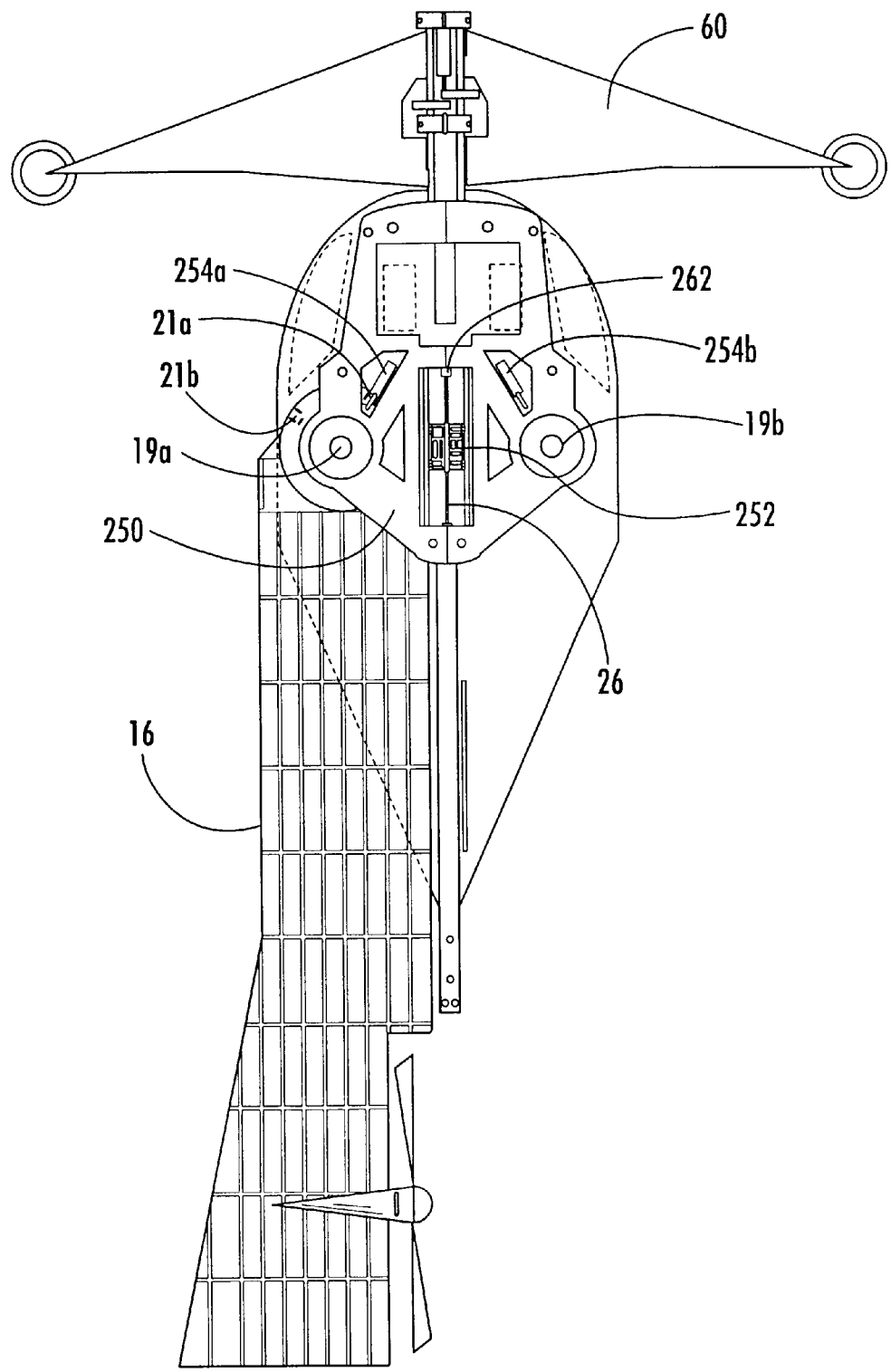
Figure 9A:
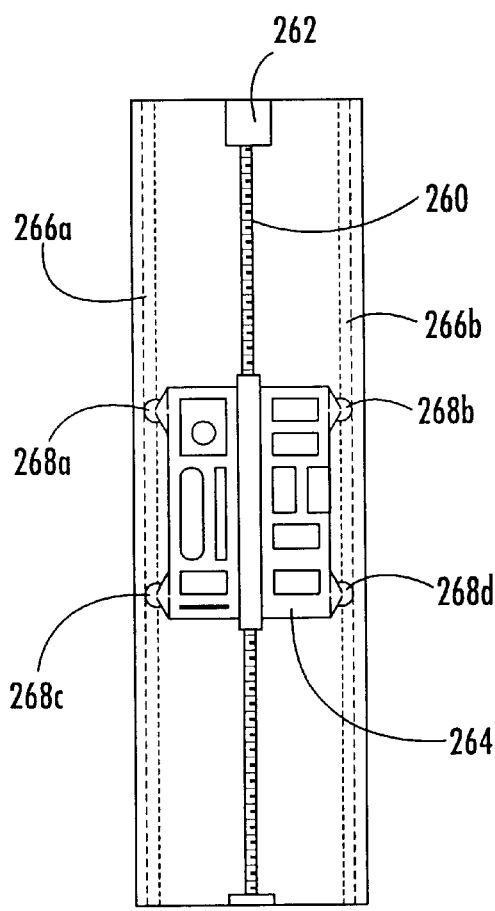
Figure 9B:
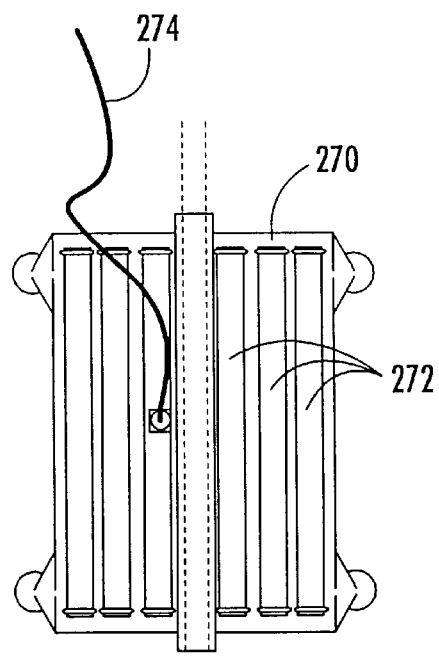
Figure 10:
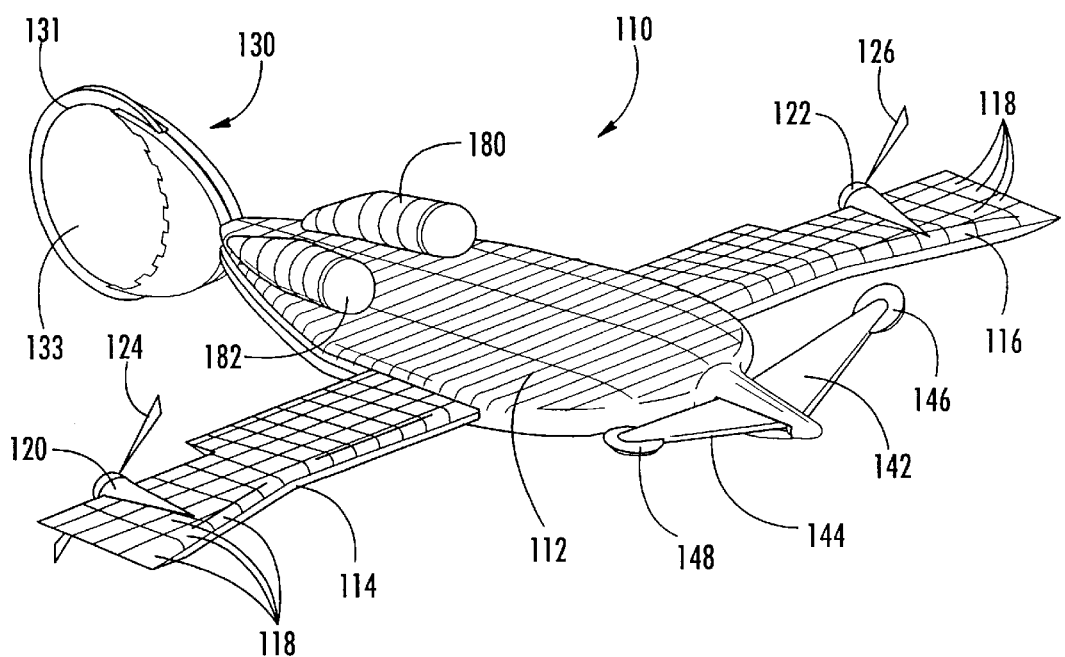
Figure 11A:
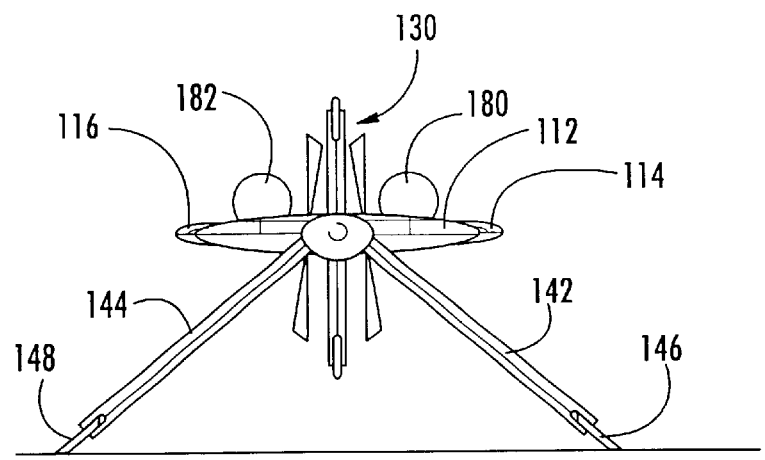
Figure 11B:
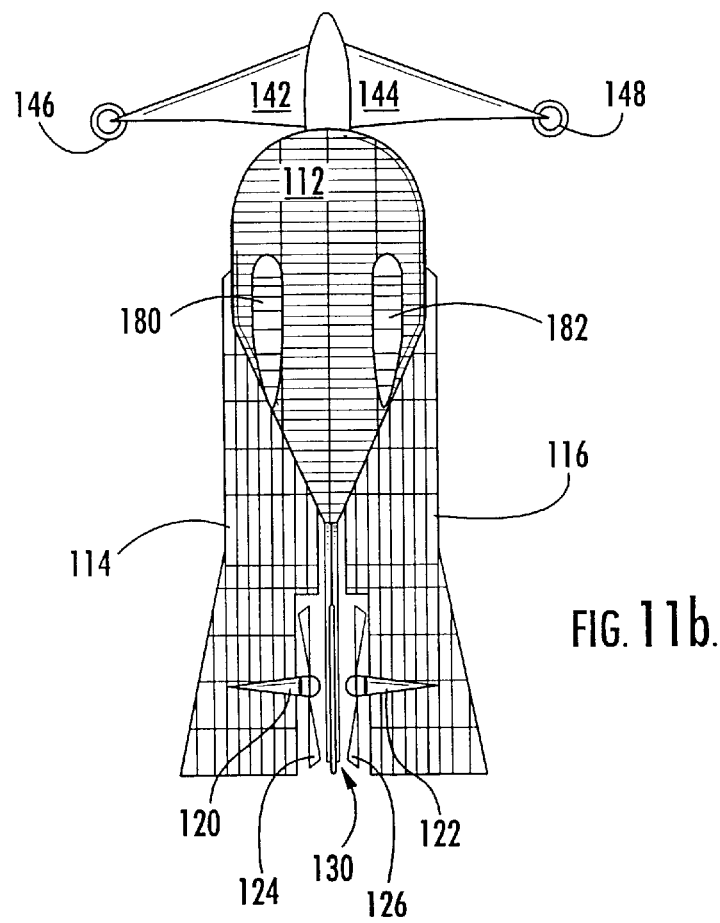
Figure 12:
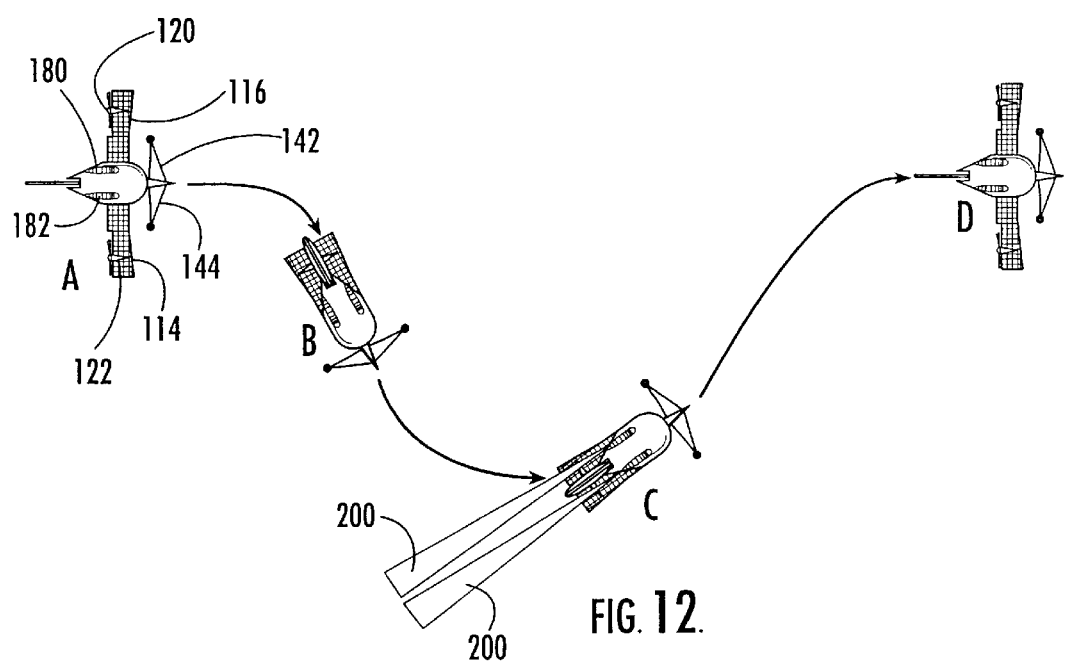

Having thus described the invention in general terms, reference will now be made to the accompanying drawings, which are not necessarily drawn to scale, and wherein:

FIG. 1 is a perspective view of an unmanned air vehicle in flight according to one embodiment of the present invention;

FIG. 2 is a plan view of an unmanned air vehicle according to one embodiment of the present invention;

FIGS. 3a and 3b are front and side elevation views, respectively, of an unmanned air vehicle on the ground according to one embodiment of the present invention;

FIGS. 4a and 4b are a top plan view and front elevation view, respectively, of an unmanned air vehicle in flight according to one embodiment of the present invention;

FIG. 5 is a plan view of a nose fairing assembly including landing gear according to one embodiment of the present invention;

FIGS. 6a and 6b are elevation and split cross section views, respectively, of an aft wheel support frame of an unmanned air vehicle according to one embodiment of the present invention;

FIGS. 7(a)–(c) are a top plan view of a wing structure, a cross section view of a wing spar, and an exploded perspective view of a wing spar for an unmanned air vehicle according to one embodiment of the present invention;

FIG. 8 is a top plan cross section of an unmanned air vehicle illustrating a fuselage frame and movable mass according to one embodiment of the present invention;

FIGS. 9a and 9b are alternative embodiments, respectively, of a movable mass according to one embodiment of the present invention;

FIG. 10 is a perspective view of an unmanned air vehicle in flight having a chemical laser weapon according to one embodiment of the present invention;

FIGS. 11a and 11b are a front elevation view and top plan view, respectively, of an unmanned air vehicle with chemical laser weapons according to one embodiment of the present invention; and FIG. 12 illustrates a flight path depicting wing retraction and weapons delivery of an unmanned air vehicle according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates one embodiment of an unmanned air vehicle 10 that is solar powered by way of photovoltaic cells 18 disposed on the wings 14, 16 and fuselage, 12. A singular rear landing gear wheel 30 is provided on the aft end of the fuselage 12, and port and starboard nose fairings 42, 44 comprise forward landing gear and control surfaces. The unmanned air vehicle includes port and starboard wings 14, 16. These wings are generally extended during flight, but are retractable toward the aft of the vehicle 10 in certain flight scenarios, such as during a ballistic dive maneuver (discussed below). The propellers 24, 26 and propeller motors 20, 22 disposed on each wing are rearward facing so that, upon retraction of port and starboard wings 14, 16 the propellers 24, 26 may be retracted adjacent the rear wheel 30.

FIG. 2 illustrates the retraction of port and starboard wings 14, 16. Port and starboard wings 14, 16 rotate about an axis perpendicular to the plane of the aircraft wing within the fuselage 12 so that each wing retracts toward the aft of the vehicle 10. A fully retracted wing position 17 is noted by the dotted lines on FIG. 2. Retraction of port and starboard wings 14, 16 may be accomplished a number of ways. For example, an electromechanical servo-motor 19a, 19b, such as commonly used to control flight control surfaces, may control the wings 14, 16 as a single unit during retraction. The electromechanical system used in this embodiment is advantageous because it is typically a lower weight than other control surface motors, such as hydraulic motors. However, other systems and methods of wing retraction, including hydraulic motors, are known to those of ordinary skill in the art and may be substituted accordingly.

The wings 14, 16 may also be locked into a number of positions by a locking device 21a, 21b on the servos, such as a detent and solenoid plunger or ratcheting mechanism or the like. This embodiment, therefore, may advantageously permit the wings 14, 16 to be locked in a number of positions between fully extended and fully retracted, depending on the desired aerodynamic conditions during flight. However, it is generally expected that the wings 14, 16 will be fully retracted or fully extended. For example, during takeoff, landing, and normal flight, the wings will normally be fully extended. For ballistic dive maneuvers (such as described below) and for ground storage the wings may be fully retracted.

Aft retraction of the wings 14, 16 provides one advantage in that, during flight, retraction permits airflow over the wing to assist in providing force to retract the wings. As described more fully below, one method of retracting the wings 14, 16 will occur at higher air speeds than deployment of the wings. Thus, aft retraction takes advantage of the higher airspeed by permitting the force of airflow to influence the wings in aft rotation.

Referring concurrently to FIGS. 1 and 2, a singular rear wheel 30 is provided that permits port and starboard propellers 24, 26 to rest adjacent to the inner retainer 33 of the wheel. An outer tire and rim assembly 31 is disposed circumferentially about the inner retainer 33. The inner retainer 33 is supported by a wheel support frame 36 (discussed in greater detail below). As the entire wheel assembly provides a very narrow profile, the retracted propellers 24, 26 come to rest adjacent the wheel assembly such that laminar air flow induces the port and starboard propellers 24, 26 to free-wheel while retracted.

As illustrated in FIGS. 1 and 2, the singular rear wheel 30 extends vertically above and below the fuselage 12. The wheel 30 and its support frame 31 have a narrow aerodynamic shape that permits the rear wheel 30 and support frame 31 to function as a vertical stabilizer for the unmanned air vehicle 10 so that no other stabilizer is necessary.

The port and starboard wings 14, 16 also include features that facilitate retraction of the propellers 24, 26. The propellers 24, 26 are rear facing, thus permitting them to lead the wings 14, 16 toward the wheel 30. Additionally, the wings 14, 16 include recessed areas 50, 52 at the mounts of the propeller motors 20. As such, the recessed areas facilitate retraction to adjacent of the outer portion of the wheel 30 proximate the wing. Another feature of the wings 14, 16 include forward swept portions 54, 56 along the leading edges of the wings. The forward swept portions 54, 56 provide additional lift surface area on the wings compensating for the lift surface area otherwise lost from the recessed portions 50, 52 at the propeller mounts. When the wings 14, 16 are retracted, the forward swept portions 54, 56 extend outwardly from the sides of the unmanned air vehicle 10 providing increased stabilization.

In one advantageous embodiment of an unmanned air vehicle 10, propellers 24, 26 are permitted to freewheel when retracted, and port and starboard propeller motors 20, 22 are reversible motor-generators. As such, the freewheeling of the port and starboard propellers 24, 26 may be used by a reversible motor-generator to generate electricity that may be supplied to a battery, electronics, or other electrical equipment (not shown) onboard the aircraft. One example of a reversible motorgenerator includes rotating permanent magnet induction machines, which are known to those of ordinary skill in the art to permit reversible operations, relatively simple electronic controls, and a high degree of speed flexibility.

Also depicted in FIGS. 1 and 2, are photovoltaic cells 18 for providing electric power to a battery, electronics, and other electrical equipment (not shown) onboard the unmanned air vehicle 10. The cells 18 are disposed on port and starboard wings 14, 16, and the fuselage 112, respectively. However, it is anticipated that cells 18 may be disposed at any point on the vehicle 10, so long as they are in a position to receive sunlight. As the photovoltaic cells 18 may be used as a primary or supplementary power source, they advantageously extend the range of an unmanned air vehicle 10, thus permitting greater mission flexibility.

Referring now to FIGS. 3a and 3b, the forward landing gear is comprised of the port and starboard nose fairings 42, 44 with wheels 46, 48 on the outermost portions of the fairings 42, 44. The nose fairing wheels 46, 48, are positioned to rotate as the vehicle 10 lands or takes off. However, as is best illustrated in FIG. 3a, the wheels 46, 48 meet the ground at an angle and the rotation of the wheel axle is non-parallel to the ground. Accordingly, the wheels include beveled sides 45, 47, which contact the ground in rotation. The beveled sides 45, 47 are also advantageous during flight providing reduced drag profile while raised, thus improving lift and control.

The port and starboard nose fairings 42, 44 are positionable about an axis generally parallel to a longitudinal axis of the unmanned air vehicle 10. For example, an actuator (described below), such as an electromechanical servomotor may be used to effect positioning of the nose fairing. To be placed in the landing gear position, the port and starboard nose fairings 42, 44 are actuated downwardly. Upon achieving the landing gear position, the fairings 42, 44 may be locked in that position in order to ensure structural support while on the ground.

Once the vehicle 10 becomes airborne, the port and starboard nose fairings no longer operate the landing gear but rather, as illustrated in FIGS. 4a and 4b, the port and starboard nose fairings 42, 44 are moved upwardly so as to operate as flight control surfaces. As such, port and starboard nose fairings 42, 44 are air foils independently maneuverable by port and starboard nose fairing actuators (described below). FIG. 4b, therefore, shows the port and starboard nose fairings 42, 44 in a position for standard flight. In order to affect directional controls of the aircraft, the nose fairings 42 may be independently maneuvered downwardly providing drag differential between each and, thus, affecting the aircraft trim in the direction opposite that of the repositioned nose fairing.

While the nose fairings 42, 44 of the above embodiment provide an advantageous method of maneuvering, the unmanned air vehicle of the invention may be supplemented by additional flight control surfaces and maneuvering methods. For example, differential control of the propeller thrust may be used for yaw control. Additionally, ailerons, rudders, elevators, and other control surfaces are well known to those of ordinary skill in the art and may be included without departing from the spirit or scope of the present invention.

Referring now to FIG. 5, one assembly 60 for port and starboard nose fairings 42, 44 is depicted. The port and starboard nose fairings 42, 44 include port and starboard wheels 46, 48 attached to the outermost portion of each fairing and landing shocks 102 for each wheel forming part of the structure of the nose fairing. Each nose fairing 42, 44 is interconnected about separate shafts 61, 62 supported at each end by forward and aft support enclosure blocks 63, 66 and bearing encased end caps 64, 65, 67, 68 within the enclosure blocks 63, 66. Each shaft 61, 62 is further supported at a center support enclosure block 70 including bearing encased rings 72, 73 about the center of each shaft 61, 62. Electromechanical servo-motors 90, 92, or other similar actuators, are mounted by way of gears 94, 96 to the support shafts 61, 2 for rotating each shaft. As such, the servo-motors 90, 92 maneuver each fairing 2, 44 either upwardly or downwardly corresponding to the rotation of the shaft 61, 62. As will be apparent to one of ordinary skill in the art, other assemblies for supporting and actuating the nose fairing may be utilized if desired.

This embodiment of a nose fairing assembly 60 also includes fore and aft locking rings 80, 81, 82, 83. The aft starboard locking ring 80 best illustrates the features of the locking rings having locking holes 84 and stabilizing ratchet grooves 86. The locking holes 84 on each locking ring permits solenoid locking pins 88, 89 to be inserted through the locking ring hole 84. The aft solenoid locking pin 88 best illustrates one embodiment of the locking pins comprising a spring 85 that compresses against a roller ball 91 contained by a cylinder 87. The spring loaded roller ball 91, therefore, permits, the locking ring 80 to rotate with less friction between the locking ring 80 and pin 88, while the pin is urged against the locking ring. Actuation of the solenoid locking pins 88, 89 may be accomplished via electromagnetic solenoid control, however, other mechanical controls and non-solenoid locking pins are well known to those of ordinary skill in the art and may be substituted accordingly.

The locking rings 80, 81, 82, 83 and locking pins 88, 89 permit locking the port and starboard nose fairings into a desired position. For example, it is advantageous to lock port and starboard nose fairings 42, 44 in a downward position for landing. Accordingly, the locking ring holes 84 will be positioned to permit the locking pins 88, 89 to be inserted through each locking ring 80, 81, 82, 83 while the nose fairings 42, 44 are in the downward position. Similarly, locking ring holes 84 may be provided at other locations on the locking ring 80, 81, 82, 83. For example, certain maneuvers, such as a ballistic dive, may require locking the nose fairings 42, 44 in a position other than the landing gear position.

Also included on the locking rings 80, 81, 82, 83 are stabilizing ratchet grooves 86. The grooves permit sufficient resistance between the locking rings 80, 81, 82, 83 and the locking pins 88, 89 to stabilize the position of the nose fairings 42, 44 when held in a particular position. The spring 85 urges the roller ball 91 against the ratchet grooves 86 to reduce the tendency of the locking ring 80 and shaft 61 to drift rotationally. This may be advantageous, for example, during steady state flight that requires the nose fairings 42, 44 to be maintained in a single position without maneuvering by the servo-motors 90, 92. While the gears 94, 96 interconnecting the shaft and servo-motor may be sufficient to maintain that position, added stabilization is obtained from the grooves 86 and spring loaded roller ball 91. Therefore, the ratchet grooves 86 may be positioned on the locking rings 80, 81, 82, 83 at positions where it is expected that the nose fairings 42, 44 will operate during steady state. Locking rings and ratchet grooves, as described above are advantageous, however, one of ordinary skill will recognize that other locking and stabilizing mechanisms may be substituted accordingly without departing from the spirit or scope of the invention.

Support for the shafts 61, 62 and actuators 90, 92 may be provided by two T-spar supports upon which the support enclosure blocks may be attached thereto. Generally, the T-spars provide structural support through at least a portion of the length of the fuselage. Other support structures are well known to those of ordinary skill in the art and may be substituted accordingly. Any other support must be capable of mounting rotating shafts 61, 62, servos 90, 92 associated equipment in order to support the port and starboard nose fairing assembly 60. It should also e noted that FIGS. 1 through 4 illustrate an elongate nose fairing 49 disposed about the described nose fairing assembly 60.

Referring now to FIG. 6a, the rear wheel support frame 36 is illustrated and comprises port and starboard wheel fairings 204, 206 interconnected to the wheel assembly 30. Port and starboard wheel fairings 204, 206 interconnect to the rear wheel retainer 33 about a hinge set 208 between the wheel retainer and on each of the port and starboard wheel fairings, respectively. Port and starboard wheel fairings 204, 206 are illustrated in greater detail in FIG. 6b, illustrating both port and starboard retainer hinges 208a, 208b that mate with the interlocking retainer hinges 208 on the wheel retainer 36, leaving, however, space for the rim 31 and tire 35 to rotate about the retainer. Retainer wheel bearings (not shown) are distributed circumferentially about the circumference of rotation between the retainer 33 and rotating rim 31. Each wheel fairing 204, 206 also includes fastener guides 210 for connecting each fairing to the fuselage along an aperture fitting 216a, 216b, and fastener guides 212 for fastening each fairing to one another, including mating surfaces 214 along both interior sides of wheel fairings.

According to one embodiment illustrated in FIG. 6b, the aperture fitting 216a, 216b mates with the fuselage 12 along resilient cushioning 218 disposed on the upper and lower surfaces of the aperture fitting 216a, 216b of both port and starboard heel fairings. For example, in this embodiment, the resilient cushioning 218 is a layer of neoprene cushion of sufficient resilience to absorb vibration from the wheel upon landing. Another advantageous feature illustrated in FIG. 6b includes a compartment 220a, 200b along the bottom surface of the wheel fairing 204, 206 for installing sensory equipment. For example, in one embodiment (discussed below), the unmanned air vehicle may be used as a tactical weapon and will require a targeting camera for its weapons delivery system. Therefore, a targeting camera may be provided in the compartment 220a, 220b of the wheel fairing for disposing sensory devices. Other sensory devices for use in targeting systems or intelligence gathering systems, etc. may accordingly be disposed in the compartment 220a, 220b as necessary for various other sensors used in missions as known to those of ordinary skill in the art.

Referring now to FIGS. 7a through 7c, a wing assembly 230 for one embodiment of an unmanned air vehicle is illustrated. FIG. 7a illustrates a wing spar 234 connected to the servo motor 19a for retracting the wing. Interconnected to the wing spar 234 are a series of airfoil frames 232 about which the wing skin and photovoltaic cells are disposed (not shown). The wing spar assembly 234 illustrated in cross-section in FIG. 7b, and in an exploded perspective in FIG. 7c, comprises three interconnected structural support spars 236a, 236b, 236c. The spars 236a, 236b, 236c mate about support hinges 240a, 240b, 240c, 240d, 240e, 240f. The wing spar assembly 234 also supports the propeller motor 22.

FIG. 8 illustrates the fuselage frame 250 and aircraft electronic controls 252 disposed on the fuselage frame for controlling various flight operations, including navigation, control surface operation, weapon systems, etc. The fuselage frame 250 provides structural support for specifically the nose fairings assembly (described above), servo motors 19a, 19b for retracting and extending port and starboard wings 14, 16. FIG. 8 also illustrates wing locking solenoids 254a, 254b disposed on the fuselage frame. In this example, locking notches 22a, 22b are provided along the connection of the servo motor 19a and wing assembly such that the notches permit the solenoid 254a to lock the wing in a fully extended position or a fully retracted position. Also illustrated in FIG. 8 is a resilient cushion 251 disposed along a structural support spar 253. In the fuselage, the resilient cushion 251, such as neoprene in this embodiment, provides a cushion for the wing skin, as the wing is retracted within an aperture space of the fuselage and therefore prevents or minimizes shock to the wing skin as a result of wing retraction.

The electronic controls 252 in this embodiment comprise a movable mass disposed on a sliding center of gravity rail controlled by a worm screw 260 and electric motor 262 and better illustrated in FIG. 9a. The worm screw 260 is threaded along a support plate 264 of the electronic controls and rotates so that the support plate moves either forward or aft with respect to the fuselage, thereby shifting the center of gravity of the unmanned air vehicle. Referring concurrently to FIGS. 9a and 9b, the support tray threaded to the worm screw is guided by and supported by rails 266a, 266b on either side of the support tray, providing lateral stability of the support tray. The support tray 264 of this embodiment travels along the rails 266a, 266b, by way of wheels 268a, 268b, 268c, 268d, disposed along the sides of tray 264.

FIG. 9b illustrates an alternative embodiment of a movable mass comprising a battery 272 disposed on the support tray 270. The battery 272 therefore provides electric power to the electronic controls disposed elsewhere on the fuselage frame interconnected to the electronic controls by way of a slackened cable 274. Other masses and additional weights may be disposed on the support tray, as necessary, to effect the center of gravity changes necessary for the control of flight of the unmanned air vehicle, depending upon weight and maneuverability requirements, as will be recognized by one of ordinary skill in the art. As such, a center of gravity rail is advantageous to shift the center of gravity of the unmanned air vehicle for purposes of special tactical maneuvers, such as a controlled ballistic dive and ascent, as described in more detail below, in conjunction with a particular weapons delivery system. Other uses for a center of gravity rail will be apparent to one of ordinary skill in the art in conjunction with other maneuverability requirements and weapons delivery systems in view of the teachings of this invention contained herein.

Referring now to FIGS. 10 and 11 (a)–(b), another embodiment of an unmanned air vehicle 110 is illustrated. This unmanned air vehicle 110 includes a fuselage 112, port and starboard retractable wings 114, 116, and aft facing port and starboard propellers 124, 126 and propeller motors 120, 122 on each retractable wing 114, 116. This embodiment of an unmanned air vehicle comprises port and starboard nose fairings 142, 144 having port and starboard wheels 146, 148. An aft wheel 130 permitting laminar air flow to freewheel port and starboard propellers 124, 126 while port and starboard wings 114, 116 are retracted is also included. The foregoing elements of an unmanned air vehicle 110 may be substantially the same as the previously described elements of an unmanned air vehicle 10 (FIG. 1). This embodiment further includes two directed energy weapons, rear facing chemical lasers 180, 182 mounted on the aft part of the fuselage 112.

One advantageous embodiment of a chemical laser is a chemical oxygen iodine laser (COIL), which is a short wavelength high-power chemical laser. The COIL produces a laser beam with a 1.31 5-$\mu$m wavelength and high output power and low atmospheric transmission loss of this wavelength makes the COIL desirable for a weapon application in an unmanned air vehicle 116.

COILs are powered by solutions of basic hydrogen peroxide (BHP). BHP is generated by the combination of alkali hydroxide, including lithium, sodium, and potassium hydroxide, with hydrogen peroxide or other suitable ions, or mixture of these ions. The term BHP typically refers to a solution having 4 molar to 8 molar concentration of perhydroxyl ion ($O_2H^-$). The perhydroxyl anions and alkali cations of the aqueous BHP solution are then reacted with chlorine gas in a singlet oxygen generator (SOG). The resultant singlet delta oxygen ($O_2(^1\Delta)$) is a metastable state of oxygen. Water vapor may be removed from the products and the products are accelerated through a supersonic expansion nozzle to create a laser gain region. The acceleration is typically accomplished by nitrogen pressure. Molecular iodine is injected and mixed with the gas flow through the nozzle into the laser cavity. The singlet delta oxygen has a resonance frequency very close to the resonance frequency of atomic iodine and causes the transfer of energy resulting in the rapid dissociation of the diatomic iodine molecule and the excitation of the iodine atoms. Energy is released from the laser cavity in the form of light, which is extracted from the excited iodine atoms by a laser resonator positioned transverse to the direction of gas flow.

A compact version of a chemical oxygen iodine laser (C-COIL) for use in an unmanned air vehicle 110 may also be advantageous. A C-COIL will reduce the payload of the unmanned air vehicle, thus improving range and versatility. One example of a C-COIL comprises an internal combustion chamber incorporating microwave excitation of oxygen and chlorine in order to superheat the oxygen and iodine while simultaneously super pressurizing the singlet delta oxygen. In the combustion chamber, a piezoelectric injector may be used to disperse the microwave excited oxygen and chlorine with high frequency oscillations. Combusted BHP, chlorine, and oxygen products are exhausted from the vent space at explosive velocity creating an air vacuum and pressure velocities that facilitate iodine lasing. Accordingly, this embodiment will provide additional thrust to the unmanned air vehicle 110 when rearward facing. This may be particularly advantageous when the laser is deployed while in an ascent position, as described more fully below. Additionally, dry low pressure chemical storage apparatuses may facilitate storing the chlorine, oxygen, and BHP internally, thus permitting the C-COIL to be a self contained unit.

As discussed in conjunction with FIG. 8, movable mass disposed along a center of gravity rail and controlled by a worm screw advantageously permits shifting the center of gravity of the fuselage during a ballistic glide maneuver. In order to deploy the aft facing chemical lasers of the FIG. 10 embodiment, the unmanned air vehicle must be in an ascent position relative to the Earth, and this is accomplished relatively close to the Earth. Therefore, a ballistic glide maneuver has been developed as a method of flying an unmanned air vehicle. Generally, the unmanned air vehicle flies at higher altitudes in order to remain undetected, taking advantage of its low profile upon the decision to deploy the chemical laser. A ballistic dive is initiated to reduce altitude, and the center of gravity rail having the movable mass toward the forward part of the fuselage, may be used to create an ascent position for deployment of the chemical laser relatively close to the Earth.

Use of a chemical laser 180, 182 on this embodiment of an unmanned air vehicle is advantageous in delivery of the weapon system through the use of a ballistic dive delivery. FIG. 12 better illustrates deployment of the chemical laser from the unmanned air vehicle 110 along a ballistic glide delivery. At step A in FIG. 12, the unmanned air vehicle 110 proceeds through normal flight with wings 114, 116 and nose fairings 142, 144 extended. At step B in FIG. 8, the propellers 120, 122 have been retracted with port and starboard wings 114, 116 into the aft wheel 30. This results in a ballistic glide path toward the earth as shown at step B. While stowed, port and starboard wings 114, 116 may be locked so that they do not further extend during the ballistic glide maneuver. Similarly, the nose fairings 142, 144 may also be locked into their maximum raised position (in this embodiment 22.5 degrees), which will assist in establishing an ascent position (step C). Also, it is also advantageous to permit the port and starboard propellers 114, 116 to freewheel in order to provide additional electricity via the reversible motor-generator to the battery and electronic equipment.

Upon achieving a ballistic glide path toward the earth, the movable mass 192 on the center of gravity rail (for example, FIG. 9) is actuated from forward to aft of the unmanned air vehicle 131. The movement of the mass changes the center of gravity to the aft of the vehicle 110, thereby redirecting the momentum of the vehicle 110 and resulting in an ascent position as shown at step C. The ascent of the vehicle 110 is then maintained by the nose fairings 142, 144, which are considerably farther forward of the center of gravity and therefore have a stabilizing effect. The increased velocity across the nose fairings compounds the drag, thereby allowing aircraft yaw movements in the direction of the fairing movement, which is reversed from normal flight control described previously.

At step C, the unmanned air vehicle 110 is now in an ascent position, and the rearward facing chemical lasers 180, 182 may then be discharged toward a target on the ground. It is expected that modem targeting systems would enable the chemical lasers' 180, 182 discharge to occur relatively close to the ground, for example, within 100 ft. of the ground. As such, the relatively short target distance permits the use of smaller chemical lasers, such as the C-COIL, with a comparatively shorter range than other chemical lasers. Discharge of the compact chemical lasers 180, 182 at this point results in additional thrust in the ascent position creating vertical acceleration of the unmanned air vehicle 10. The explosive embodiment C-COIL previously described may further enable substantial thrust at this point.

Upon completing the discharge of the chemical lasers, and typically at the apex of ascent, port and starboard wings are unlocked and may be redeployed, as at step D. Upon redeployment, port and starboard propellers 120, 122 are reenergized and operate under motor power to provide thrust. Therefore, normal flight may be resumed.

As will be understood by one of ordinary skill in the art, the chemical lasers 180, 182 may be used in conjunction with targeting systems and imaging systems for obtaining targeting on the ground. The flight controls of the unmanned air vehicle may then correspondingly be controlled in order to achieve ballistic glide in ascent with respect to a desired target. Another additional advantage of the chemical laser is that it does not require a larger amount of electricity to operate, thus the electricity supplied by both the reversible motor generators and the photovoltaic cells is sufficient to maintain flight and energy storage within a battery and to ignite the chemical laser.

Many modifications and other embodiments of the inventions set forth herein ill come to mind to one skilled in the art to which these inventions pertain having he benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An unmanned aerial vehicle comprising:
   a fuselage defining a forward portion, an aft portion, a port side and a starboard side;
   a port and a starboard nose fairings being pivotably attached to the forward portion of the fuselage;
   a port retractable wing interconnected to the port side of the fuselage and retractable along the port side and aft portion of the fuselage;
   a starboard retractable wing interconnected to the starboard side of the fuselage and retractable along the starboard side and aft portion of the fuselage;
   at least one propeller motor and propeller interconnected to the fuselage;
   a movable mass interconnected to the fuselage and positionable between the forward portion and aft portion of the fuselage; and
   an actuator interconnecting the fuselage and the movable mass, and capable of positioning the movable mass between the forward portion and the aft portion of the fuselage.

2. The unmanned aerial vehicle according to claim 1, further comprising a port nose fairing actuator and a starboard nose fairing actuator, each actuator interconnected to its respective nose fairing and capable of pivoting the port and starboard nose fairings with respect to the fuselage.

3. The unmanned aerial vehicle according to claim 2, further comprising a port wheel and a starboard wheel, the port wheel interconnected to an outward portion of the port nose fairing, a starboard wheel interconnected to an outward portion of the starboard nose fairing, port and starboard wheels interconnected to the nose fairing to permit rotation of the wheels in a direction of flight over ground during a landing.

4. The unmanned aerial vehicle according to claim 3, wherein the port and starboard wheels have a tapered ground contact area to permit the wheel to rotate at an angle to the ground during the landing.

5. An unmanned aerial vehicle comprising:
   a fuselage defining a forward portion, an aft portion, a port side and a starboard side;
   a port retractable wing interconnected to the port side of the fuselage and retractable along the port side and aft portion of the fuselage;
   a starboard retractable wing interconnected to the starboard side of the fuselage and retractable along the starboard side and aft portion of the fuselage;
   a movable mass interconnected to the fuselage and positionable between the forward portion and aft portion of the fuselage;
   an actuator interconnecting the fuselage and the movable mass, and capable of positioning the movable mass between the forward portion and the aft portion of the fuselage;
   a port propeller motor and propeller interconnected to an aft section of the port retractable wing,
   a starboard propeller motor and propeller interconnected to an aft section of the starboard retractable wing; and
   a wheel interconnected to the aft portion of the fuselage to permit rotation of the wheel in a direction of flight over ground during landing and disposed to permit laminar flow of air between the wheel and propellers when retracted.

6. The unmanned aerial vehicle according to claim 5, wherein the wheel further comprises a wheel assembly comprising:
   a wheel retainer interconnected to an aft end of the fuselage;
   a wheel rim rotatably disposed about the retainer;
   a plurality of wheel bearings disposed between the wheel rim and wheel retainer to permit rotation of the wheel rim about the wheel retainer; and
   a tire circumferentially disposed about the rim.

7. The unmanned aerial vehicle according to claim 6, wherein the wheel assembly further comprises a wheel support frame interconnecting the aft end of the fuselage to the wheel retainer.

8. The unmanned aerial vehicle according to claim 7, wherein the wheel support frame comprises port and starboard wheel fairings, each wheel fairing being hingedly connected to the wheel retainer.

9. The unmanned aerial vehicle according to claim 1, wherein the at least one propeller motor comprises a reversible motor-generator and the at least one propeller is capable of freewheeling by passage of air such that the freewheeling permits generation of an electric current by the motor generator.

10. The unmanned aerial vehicle according to claim 1, further comprising a battery electrically interconnected to and capable of supplying current to the at least one propeller motor.

11. The unmanned aerial vehicle according to claim 10, further comprising at least one photovoltaic cell capable of providing an electric current to the battery.

12. The unmanned aerial vehicle according to claim 11, further comprising the photovoltaic cell being disposed on a wing surface.

13. The unmanned aerial vehicle according to claim 11, further comprising the photovoltaic cell being disposed on the fuselage.

14. The unmanned aerial vehicle according to claim 1, further comprising a directed energy weapon disposed on the fuselage.

15. The unmanned aerial vehicle according to claim 14, wherein the directed energy weapon comprises at least one chemical oxygen iodine laser.

16. The unmanned aerial vehicle according to claim 1, wherein the actuator comprises a motorized worm screw.

17. An unmanned aerial vehicle comprising:
- a fuselage defining a forward portion, an aft portion, a port side and a starboard side;
- a port retractable wing interconnected to the port side of the fuselage and retractable along the port side and aft portion of the fuselage;
- a starboard retractable wing interconnected to the starboard side of the fuselage and retractable along the starboard side and aft portion of the fuselage;
- a port propeller motor and propeller interconnected to an aft section of the port retractable wing;
- a starboard propeller motor and propeller interconnected to an aft section of the starboard retractable wing; and
- a wheel interconnected to the aft portion of the fuselage to permit rotation of the wheel in a direction of flight over ground during landing, and disposed to permit laminar flow of air between the wheel and propellers when retracted.

18. The unmanned aerial vehicle according to claim 17, wherein the wheel further comprises a wheel assembly comprising:
- a wheel retainer interconnected to an aft end of the fuselage;
- a wheel rim rotatably disposed about the retainer;
- a plurality of wheel bearings disposed between the wheel rim and wheel retainer to permit rotation of the wheel rim about the wheel retainer; and
- a tire circumferentially disposed about the rim.

19. The unmanned aerial vehicle according to claim 18, wherein the wheel assembly further comprises a wheel support frame interconnecting the aft end of the fuselage to the wheel retainer.

20. The unmanned aerial vehicle according to claim 19, wherein the wheel support frame comprises port and starboard wheel fairings, each wheel fairing being hingedly connected to the wheel retainer.

21. The unmanned aerial vehicle according to claim 17, further comprising a nose fairing disposed along the forward portion of the fuselage.

22. The unmanned aerial vehicle according to claim 21, wherein the nose fairing further comprises a port nose fairing and a starboard nose fairing pivotably attached to the forward portion of the fuselage.

23. The unmanned aerial vehicle according to claim 22, further comprising a port nose fairing actuator and a starboard nose fairing actuator, each actuator interconnected to its respective nose fairing and capable of pivoting the port and starboard nose fairings with respect to the fuselage.

24. The unmanned aerial vehicle according to claim 17, further comprising
- a movable mass interconnected to the fuselage and positionable between the forward portion and aft portion of the fuselage; and
- an actuator interconnecting the fuselage and the movable mass, and capable of positioning the movable mass between the forward portion and the aft portion of the fuselage.

25. The unmanned aerial vehicle according to claim 24, wherein the actuator comprises a motorized worm screw.

26. The unmanned aerial vehicle according to claim 17, wherein the at least one propeller motor comprises a reversible motor-generator and the at least one propeller being capable of freewheeling by passage of air such that the freewheeling permits generation of an electric current by the motor generator.

27. The unmanned aerial vehicle according to claim 17, further comprising a battery electrically interconnected to and capable of supplying current to the at least one propeller motor.

28. The unmanned aerial vehicle according to claim 27, further comprising at least one photovoltaic cell capable of providing an electric current to the battery.

29. The unmanned aerial vehicle according to claim 28, further comprising the photovoltaic cell being disposed on a wing surface.

30. The unmanned aerial vehicle according to claim 28, further comprising the photovoltaic cell being disposed on the fuselage.

31. The unmanned aerial vehicle according to claim 17, further comprising a directed energy weapon disposed on the fuselage.

32. The unmanned aerial vehicle according to claim 31, wherein the directed energy weapon comprises at least one chemical oxygen iodine laser.

33. An unmanned aerial vehicle comprising:
- a fuselage having a forward portion and an aft portion;
- a wing surface interconnected to the fuselage;
- at least one propeller motor and propeller interconnected to the fuselage;
- a port nose fairing pivotably attached to the forward portion of the fuselage and extending outwardly from the fuselage to a port side of the fuselage;
- a port nose fairing actuator interconnected to the port nose fairing to permit the actuator to pivot the port nose fairing;
- a port nose wheel interconnected to an outward portion of the port nose fairing to permit rotation of the port nose wheel in a direction of flight over ground during landing;
- a starboard nose fairing pivotably attached to the forward portion of the fuselage and extending outwardly from the fuselage to a starboard side of the fuselage;
- a starboard nose fairing actuator interconnected to the starboard nose fairing to permit the actuator to pivot the starboard nose fairing; and
- a starboard nose wheel interconnected to an outward portion of the starboard nose fairing to permit rotation of the starboard nose wheel in a direction of flight over ground during landing.

34. The unmanned aerial vehicle according to claim 33, wherein the wheels have a tapered ground contact area to permit the wheel to rotate at an angle to the ground during the landing.

35. The unmanned aerial vehicle according to claim 33, wherein the at least one propeller motor and propeller comprises:
- a port propeller motor and propeller interconnected to an aft section of the port retractable wing;
- a starboard propeller motor and propeller interconnected to an aft section of the starboard retractable wing; and
- a wheel interconnected to the aft portion of the fuselage to permit rotation of the wheel in a direction of flight over ground during landing, and disposed to permit laminar flow of air between the wheel and propellers when retracted.

36. The unmanned aerial vehicle according to claim 35, wherein the wheel further comprises a wheel assembly comprising:
    a wheel retainer interconnected to an aft end of the fuselage;
    a wheel rim rotatably disposed about the retainer;
    a plurality of wheel bearings disposed between the wheel rim and wheel retainer to permit rotation of the wheel rim about the wheel retainer; and
    a tire circumferentially disposed about the rim.

37. The unmanned aerial vehicle according to claim 36, wherein the wheel assembly further comprises a wheel support frame interconnecting the aft end of the fuselage to the wheel retainer.

38. The unmanned aerial vehicle according to claim 37, wherein the wheel support frame comprises port and starboard wheel fairings, each wheel fairing being hingedly connected to the wheel retainer.

39. The unmanned aerial vehicle according to claim 33, wherein the at least one propeller motor comprises a reversible motor-generator and the at least one propeller being capable of freewheeling by passage of air such that the freewheeling permits generation of an electric current by the motor generator.

40. The unmanned aerial vehicle according to claim 33, further comprising a battery electrically interconnected to and capable of supplying current to the at least one propeller motor.

41. The unmanned aerial vehicle according to claim 40, further comprising at least one photovoltaic cell capable of providing an electric current to the battery.

42. The unmanned aerial vehicle according to claim 41, further comprising the photovoltaic cell being disposed on a wing surface.

43. The unmanned aerial vehicle according to claim 41, further comprising the photovoltaic cell being disposed on the fuselage.

44. The unmanned aerial vehicle according to claim 33, further comprising a directed energy weapon disposed on the fuselage.

45. The unmanned aerial vehicle according to claim 44, wherein the directed energy weapon comprises at least one chemical oxygen iodine laser.

46. An unmanned aerial vehicle comprising:
    a fuselage having a forward portion and an aft portion;
    a wing surface interconnected to the fuselage;
    a port retractable wing interconnected to the port side of the fuselage and retractable along the port side and aft portion of the fuselage;
    a starboard retractable wing interconnected to the starboard side of the fuselage and retractable along the starboard side and aft portion of the fuselage;
    at least one propeller reversible motor-generator interconnected to the fuselage permitting motor operation and freewheeling electric generator operation; and
    a propeller interconnected to the at least one propeller motor-generator capable of freewheeling by air passage through the propeller;
    a port propeller motor and propeller interconnected to an aft section of the port retractable wing;
    a starboard propeller motor and propeller interconnected to an aft section of the starboard retractable wing; and
    a wheel interconnected to the aft portion of the fuselage to permit rotation of the wheel in a direction of flight over ground during landing, and disposed to permit laminar flow of air between the wheel and propellers when retracted.

47. The unmanned aerial vehicle according to claim 46, further comprising:
    a movable mass interconnected to the fuselage and positionable between the forward portion and aft portion of the fuselage; and
    an actuator interconnecting the fuselage and the movable mass, and capable of positioning the movable mass between the forward portion and the aft portion of the fuselage.

48. The unmanned aerial vehicle according to claim 47, wherein the actuator comprises a motorized worm screw.

49. The unmanned aerial vehicle according to claim 46, further comprising a nose fairing disposed along the forward portion of the fuselage.

50. The unmanned aerial vehicle according to claim 49, wherein the nose fairing further comprises a port nose fairing and a starboard nose fairing pivotably attached to the forward portion of the fuselage.

51. The unmanned aerial vehicle according to claim 50, further comprising a port nose fairing actuator and a starboard nose fairing actuator, each actuator interconnected to its respective nose fairing and capable of pivoting the port and starboard nose fairings with respect to the fuselage.

52. The unmanned aerial vehicle according to claim 51, further comprising a port wheel and a starboard wheel, the port wheel interconnected to an outward portion of the port nose fairing, a starboard wheel interconnected to an outward portion of the starboard nose fairing, port and starboard wheels interconnected to the nose fairing to permit rotation of the wheels in a direction of flight over ground during a landing.

53. The unmanned aerial vehicle according to claim 52, wherein the port and starboard wheels have a tapered ground contact area to permit the wheel to rotate at an angle to the ground during the landing.

54. The unmanned aerial vehicle according to claim 46, wherein the wheel further comprises a wheel assembly comprising:
    a wheel retainer interconnected to an aft end of the fuselage;
    a wheel rim rotatably disposed about the retainer;
    a plurality of wheel bearings disposed between the wheel rim and wheel retainer to permit rotation of the wheel rim about the wheel retainer; and
    a tire circumferentially disposed about the rim.

55. The unmanned aerial vehicle according to claim 54, wherein the wheel assembly further comprises a wheel support frame interconnecting the aft end of the fuselage to the wheel retainer.

56. The unmanned aerial vehicle according to claim 55, wherein the wheel support frame comprises port and starboard wheel fairings, each wheel fairing being hingedly connected to the wheel retainer.

57. The unmanned aerial vehicle according to claim 46, further comprising a battery electrically interconnected to and capable of supplying current to the at least one propeller motor.

58. The unmanned aerial vehicle according to claim 57, further comprising at least one photovoltaic cell capable of providing an electric current to the battery.

59. The unmanned aerial vehicle according to claim 58, further comprising the photovoltaic cell being disposed on a wing surface.

60. The unmanned aerial vehicle according to claim 58, further comprising the photovoltaic cell being disposed on the fuselage.

61. The unmanned aerial vehicle according to claim 46, further comprising a directed energy weapon disposed on the fuselage.

62. The unmanned aerial vehicle according to claim 61, wherein the directed energy weapon comprises at least one chemical oxygen iodine laser.

63. A method of flying an unmanned aerial vehicle having pivotable port and starboard nose fairings, port and starboard nose fairings each having a wheel, the method comprising:

individually pivoting the port and starboard nose fairings to control direction of flight of the vehicle;

pivoting the port and starboard nose fairings downwardly; and landing the vehicle on the wheels while the port and starboard nose fairings are pivoted downwardly.

64. The method according to claim 63, further comprising locking the port and starboard nose fairings after the step of pivoting the port and starboard nose fairings downwardly.

65. The method according to claim 63, wherein the step of individually pivoting the port and starboard nose fairings to control the direction of flight includes pivoting the fairings to control lift.

66. The method according to claim 63, wherein the step of individually pivoting the port and starboard nose fairings to control the direction of flight includes pivoting the fairings to control yaw.

67. A method of flying an unmanned aerial vehicle having port and starboard retractable wings and a nose fairing comprising:

retracting the port and starboard wings on the unmanned air vehicle from a normal flying position;

positioning a nose fairing to achieve a downward angle permitting a ballistic glide path toward earth;

positioning a mass from fore to aft with respect to the unmanned air vehicle; and positioning the nose fairing to achieve an ascent position of the unmanned air vehicle with respect to the ground.

68. The method according to claim 67, wherein the step of retracting the port and starboard wings comprises unlocking the port and starboard wings and permitting air flow against the wings to cause the wings to retract.

69. The method according to claim 67, further comprising locking the port and starboard wings in a stowed position along an aft portion of the vehicle.

70. The method according to claim 67, further comprising discharging a directed energy weapon from the vehicle in a direction aft of the vehicle after the step of positioning the nose fairing to achieve an ascent position.

71. The method according to claim 70, wherein the step of discharging a directed energy weapon further comprises discharging the weapon in an aft direction creating ascent thrust.

72. The method according to claim 67, further comprising discharging a thrust mechanism in a direction aft of the vehicle.

73. The method according to claim 67, further comprising individually pivoting the port and starboard nose fairings to control direction of flight of the vehicle.

74. The method according to claim 67, further comprising repositioning the port and starboard wings to a normal flying position; and positioning the mass from aft to fore with respect to the vehicle.

75. A method of flying an unmanned aerial vehicle having port and starboard propeller motor-generators interconnected to retractable port and starboard wings respectively, the method comprising:

retracting the port and starboard wings from a normal flying position;

freewheeling the propeller while the wings are retracted; and generating an electrical current at an output of the motor generator from the freewheeling propeller.

76. The method according to claim 75, further comprising:

repositioning the port and starboard wings to a normal flying position; and operating the port and starboard motor generators under motor power to provide thrust for the vehicle.

77. A nose assembly for an unmanned air vehicle comprising:

a support structure capable of being interconnected to the unmanned air vehicle;

a port nose fairing pivotably attached to the support structure extending outwardly from the support structure to a port side of the fuselage;

a port nose fairing actuator interconnected to the port nose fairing to permit the actuator to pivot the port nose fairing;

a port nose wheel interconnected to an outward portion of the port nose fairing to permit rotation of the port nose wheel in a direction of flight over ground during a landing of the unmanned air vehicle;

a starboard nose fairing pivotably attached to the support structure extending outwardly from the support structure to a starboard side of the fuselage;

a starboard nose fairing actuator interconnected to the starboard nose fairing to permit the actuator to pivot the starboard nose fairing; and a starboard nose wheel interconnected to an outward portion of the starboard nose fairing to permit rotation of the starboard nose wheel in a direction of flight over ground during a landing of the unmanned air vehicle.

78. The nose assembly according to claim 77, wherein the port and starboard nose fairings each further comprise an airfoil capable of independently controlling yaw of the unmanned air vehicle.

79. The nose assembly according to claim 77, wherein the port and starboard wheels each further comprise a tapered ground contact area to permit the wheel to rotate at an angle to the ground during the landing.

80. The nose assembly according to claim 77, wherein port and starboard actuators each further comprise:

a pivotable shaft fixedly connected to the nose fairing at a pivot axis; and a rotating machine interconnected to the pivotable shaft for rotating the shaft to pivot the nose fairing.

81. The nose assembly according to claim 80, wherein the rotating machine comprises an electromechanical servomotor.

82. The nose assembly according to claim 80, wherein the actuator further comprises a gear for interconnecting the rotating to the shaft.

83. The nose assembly according to claim 82, further comprising:

at least one locking ring fixedly disposed about the shaft; and a locking device for preventing movement of the locking ring in a predetermined position.

84. The nose assembly according to claim 83, wherein the locking ring further comprises at least one locking hole, and the locking device further comprises a locking pin disposed in an opposed relationship to the locking hole and capable of being inserted into the locking hole.

85. The nose assembly according to claim 84, wherein the locking ring further comprises at least one ratchet groove for resisting movement of the locking ring at a predetermined position.

86. The nose assembly according to claim 85, wherein the locking pin further comprises:

a cylinder having a partially enclosed end proximate the locking ring, the partially enclosed end being capable of being inserted into the locking hole;

a roller ball restrained by the partially enclosed end of the cylinder and capable of being inserted into the ratchet groove; and a spring disposed within the cylinder to urge the roller ball toward the partially enclosed end.

87. The nose assembly according to claim 84, wherein the locking pin further comprises an electrically controllable solenoid for urging the locking pin in a direction with respect to the locking ring.

* * * * *